United States Patent [19]

Temple

[11] 4,358,501

[45] Nov. 9, 1982

[54] STORAGE STABLE POLYOLEFIN COMPATIBLE SIZE FOR FIBER GLASS STRANDS

[75] Inventor: Chester Temple, McKees Rocks, Pa.

[73] Assignee: PPG Industries, Inc., Pittsburgh, Pa.

[21] Appl. No.: 239,944

[22] Filed: Mar. 3, 1981

Related U.S. Application Data

[63] Continuation of Ser. No. 933,237, Aug. 14, 1978, abandoned.

[51] Int. Cl.³ .................... D04H 1/58; B32B 27/00; B32B 27/12; D04H 1/48
[52] U.S. Cl. .................................. 428/268; 156/166; 156/173; 156/330; 156/332; 156/334; 427/389.8; 427/389.9; 427/299; 428/290; 428/288
[58] Field of Search ............... 428/290, 478, 288, 475, 428/391, 392, 428, 441, 268; 206/392, 484; 65/3.41–3.44; 156/166, 173, 330, 332, 334; 427/369.7, 389.8, 389.9, 434.6, 434.7

[56] References Cited

U.S. PATENT DOCUMENTS

| | | | |
|---|---|---|---|
| 2,674,619 | 4/1954 | Lundsted | 260/485 |
| 3,143,405 | 8/1964 | Wong | 65/3 C |
| 3,437,550 | 4/1969 | Paul, Jr. | 161/93 |
| 3,597,265 | 8/1971 | Mecklenborg et al. | 260/29.6 NR |
| 3,664,909 | 5/1972 | Ackley | 161/141 |
| 3,731,411 | 5/1973 | Barber et al. | 38/144 |
| 3,849,148 | 11/1974 | Temple | 106/287 |
| 3,882,068 | 5/1975 | Swartz | 260/29.6 |
| 3,883,333 | 5/1975 | Ackley | 65/2 |
| 3,920,526 | 11/1975 | Furukawa et al. | 260/22 R |
| 3,925,328 | 12/1975 | Shibahara et al. | 8/115.6 X |
| 3,997,306 | 12/1976 | Hedden | 65/3 C |
| 4,104,434 | 8/1978 | Johnson | 428/273 |
| 4,121,901 | 10/1978 | Bourrain et al. | 8/115.6 |

FOREIGN PATENT DOCUMENTS

| | | |
|---|---|---|
| 1494899 | 1/1971 | Fed. Rep. of Germany . |
| 1619135 | 3/1973 | Fed. Rep. of Germany . |
| 52-48233 | 12/1977 | Japan . |
| 919318 | 2/1963 | United Kingdom . |
| 1025913 | 4/1966 | United Kingdom . |
| 1054506 | 1/1967 | United Kingdom . |
| 1083729 | 9/1967 | United Kingdom . |
| 1087906 | 10/1967 | United Kingdom . |
| 1136548 | 11/1968 | United Kingdom . |
| 1142802 | 2/1969 | United Kingdom . |
| 1250194 | 10/1971 | United Kingdom . |
| 1278484 | 6/1972 | United Kingdom . |
| 1347186 | 2/1974 | United Kingdom . |
| 1357029 | 6/1974 | United Kingdom . |
| 1359558 | 7/1974 | United Kingdom . |

*Primary Examiner*—Michael R. Lusignan
*Assistant Examiner*—Thurman K. Page
*Attorney, Agent, or Firm*—Kenneth J. Stachel

[57] ABSTRACT

Continuous glass fiber forming packages with a sizing composed of a coupling agent, a stabilizer, a lubricant, a non-crosslinking film-forming polymer and a self-reactive crosslinking film-forming polymer are disclosed for utilization in polyolefin polymer reinforcement. The article formed and formation method for fiber combination with a polyolefin polymer are also disclosed.

28 Claims, No Drawings

STORAGE STABLE POLYOLEFIN COMPATIBLE SIZE FOR FIBER GLASS STRANDS

This is a continuation of application Ser. No. 933,237, filed Aug. 14, 1978, now abandoned.

BACKGROUND OF THE INVENTION

1. Field of the Invention

The present invention relates to glass fiber strand treatment and particularly relates to treating glass fibers during or after forming with an aqueous sizing which prepares the glass fibers for bonding to polyolefins in the reinforcement of polyolefin materials and further has long shelf life and can be used from forming packages.

2. Description of the Prior Art

It is known that glass fibers in the form of continuous strands, chopped strands or mats can be used successfully to reinforce polyolefins. And it is known that without effective coupling between the glass and the polyolefin, the adhesion between the two will be weak and separation will occur under shear or tensile stresses. It is further known that the affinity of glass for water aggravates bond weakness when glass is inadequately bonded to polyolefins.

A workable method has been disclosed which permits bonding glass to "lower" polyolefins which are essentially crystalline plastics formed from monomers having three or more carbon atoms. As disclosed in U.S. Pat. No. 3,013,915 at column 2, lines 38–46, glass bonding to polyolefins may be improved by "cleaning the glass surface, applying a coupling agent to it, treating with a chemical agent which is a source of dehydrogenating or oxidizing radicals, contacting the polyolefin with the glass, and fusing it by heating the polyolefin above its melting point to complete the interbonding." At column 4, lines 16–19, the disclosure reveals a preference for radical sources having low decomposition points below 180° F. also note column 4, lines 69–71.

U.S. Pat. No. 3,849,148 proposes the method of sizing fiber glass strands with an aqueous sizing containing a coupling agent, a heat stable organic peroxide, a nonionic surfactant and a lubricant. This process was successful in giving some storage capability to the sized strands but did not result in long storage life and further remains susceptible to degradation by high storage temperatures.

U.S. Pat. No. 3,882,068 discloses the sizing composition for glass fibers in several plastic resin systems wherein the size comprises a coupling agent and a polyolefin emulsion.

U.S. Pat. No. 3,437,550 discloses a method of increasing the bonding of glass fibers to polyolefins by treating the fiber with a crystalline polypropylene matrix polymer. The preferred modifiers disclosed are maleic anhydride and acrylic acid.

U.S. Pat. No. 3,883,333 discloses a method and apparatus for forming a continuous glass fiber mat of sized fibers that are suitable for bonding with polyolefins. The process and apparatus, although continuous, discloses lay down of the fibers immediately after formation of strands.

While the above processes and compositions were useful, there remains a need in the art for a sizing to promote the binding of polyolefins to continuous glass fiber strands with increased adhesion. Further, there remains a need for a sizing for glass fiber strands which will allow the formation of the sized fiber into forming packages that may be stored indefinitely prior to use. Effective sizings containing peroxides have limited shelf-life since they are very sensitive to elevated temperature variations during drying of the fibers and high temperatures during storage which can cause premature degradation of the peroxides thus reducing the effectiveness of the sizing in binding the glass fiber strands to the polypropylene matrix.

SUMMARY OF THE INVENTION

It is an object of this invention to overcome the disadvantages of the prior processes and compositions.

It is another object of this invention to provide a storage stable polyolefin bonding sizing for continuous glass fibers.

It is another object of this invention to produce polyolefin glass fiber composites using glass fibers from forming packages.

It is further additional object to produce storage stable forming packages of polyolefin compatable glass fiber strands.

It is another object to create a polyolefin bonding sizing not susceptible to thermal degradation during the drying operation.

These and other objects of the invention are generally accomplished by applying a sizing comprising a coupling agent, a stabilizer, a lubricant, a non-crosslinkable film-former, a self-reactive crosslinking film former, and an aqueous carrier to a glass fiber strand. The sized strand is then wound into a forming package and dried for later use as a reinforcement for polypropylene material.

In a preferred embodiment of the invention, an aqueous sizing comprising a coupling agent of gamma-amino-propyltriethoxysilane, a stabilizer comprising cis-butenedioic acid, a lubricant of an emulsion of maleonated amorphous polypropylene, a non-crosslinkable film former of vinyl acetate homopolymer, and a self-reactive copolymer of vinyl acetate and n-methylolacrylamide are applied in an aqueous sizing to a glass fiber so as to impregnate the strand and improve its ability to reinforce polypropylene articles. The strand after being wound as a forming package and drying to remove the aqueous carrier may be withdrawn from the forming package and laid down on a mat which is contacted with polypropylene sheet and under heat and pressure formed into a fiber reinforced article.

DESCRIPTION OF THE PREFERRED EMBODIMENTS

The utilization of the sizing system of the instant invention results in numerous advantages over the prior processes. The utilization of a storage stable sizing with no shelf-life limitation improves production capability because it allows the storing and distribution of forming packages of sized glass fiber strand. Prior to the instant invention, it was necessary that the sized fiber be used shortly after forming or be immediately formed into a mat for forming composite articles. Further, the drying of the sized fiber was difficult as the drying temperature conditions were limited by a necessity to not decompose the peroxide, an important ingredient of the sizing. With utilization of the instant system, it is possible to form forming packages of sized glass fiber strands at a central location. These may be then shipped without limitations as to temperature or atmosphere during shipping to distant points for fabrication into composite polyolefin glass-fiber-reinforced articles. This offers considerable improvement since the forming of glass strands no longer must be carried out at the same location that the polyolefin glass fiber reinforced article is formed. Thus as can be seen that although the individual ingredients had been used in other sizings, the instant combination of ingredients allows the achievement of numerous advantages not present in prior systems.

Any glass suitable for reinforcing and for drawing in fiber form may suitably be treated in accordance with the present invention. Soda-lime glasses and borosilicate ("E") glasses are particularly suited for this practice.

The glass fiber strands to be treated according to this invention may be typically produced according to the teachings of U.S. Pat. No. 2,133,238. The glass fiber strands are composed of a multitude of fine glass filaments which are formed by being drawn at a high rate of speed from molten cones of glass located at the tips of small orifices in a bushing. During formation, the filaments are coated with the aqueous sizing prepared according to the description below. Coating of the filaments takes place while they are moving at a speed of the order of 1,000 to 20,000 feet per minute. The coating is accomplished in the immediate vicinity of the hot bushings and the glass furnace in which the glass is melted, and after coating, the glass fiber strands move a short distance onto collecting means. After the strands have been sized, they may be dried to drive off residual moisture from the sized glass.

The aqueous sizing to contact, impregnate and coat the glass fiber strand is composed of a coupling agent, a stabilizer, a lubricant, a non-crosslinking film former and a self-reactive crosslinking film former.

The coupling agent may be any interfacial boundary area adhesive compound which acts to unite the surface of the glass fiber strand with the polyolefin polymer. Among typical coupling agents for uniting glass fiber strand and polymers are metal salts of the strong metal acids such as basic chromium chloride, basic chromium sulfide having a trivalent metal ion selected from the group consisting of chromium, cobalt, nickel, copper, and lead having at least one hydroxyl group attached to the metal and at least one anion of a strong mineral acid attached to the metal; Werner type complexes in which a trivalent nuclear atom such as chromium is coordinated with an organic acid such as methacrylic acid, for instance, methacrylic acid complex of chromic chloride, and other Werner type coupling agents, having vinyl, alkyl, amino, epoxy, mercapto, thioalkyl and phenol groups. Suitable for the utilization in the instant invention are coupling agents from the silane and siloxane groups. Typical of such coupling agents are hydrolyzable, vinyl, allyl, beta-chloropropyl, phenyl, thioalkyl, thio-alkaryl, amino-alkyl, methacrylato, epoxy, and mercapto silanes their hydrolysis products and polymers of hydrolysis products and mixtures of any of these. A preferred coupling agent is gamma-aminopropyltriethoxysilane as this material has been found to provide very good coupling between the glass fiber strand and polyolefin polymers at low concentrations and with good stability.

Any stabilizer may be selected which acts as a secondary coupler to improve the stability of the sizing system, assists in crosslinking, improves the coupling agent fiber interface and assists the action of the silane in coupling. Typical of stabilizers for sizes suitable for the instant invention are ethylenically unsaturated mono or di-carboxylic acids or anhydrides. Examples of such acids and anhydrides include maleic acid, fumaric acid, itaconic acid, citraconic acid, acrylic acid, methacrylic acid, crotonic acid, isocrotonic acid, mesaconic acid, himic anhydride, maleic anhydride, itaconic anhydride and citraconic anhydride, and mixtures thereof. A preferred stabilizer is maleic acid (cis-butenedioic acid) that gives a stable system and improves the coupling action of the silane coupling agent.

Any material that acts as a lubricant to aid film forming and assist the coupling may be used as the lubricant of the invention. Suitable lubricants are chemically modified propylenes. Maleonated or acrylic modified polypropylenes are preferred as they result in a sized fiber with good storage properties and ability to feed from the forming package.

The polymer which forms the non-crosslinkable film former material of the sizing of the system of the instant invention may be any material that provides strand integrity to aid in the process-ability of the glass fiber strand allowing strand removal from a forming package. The non-crosslinkable polymer provides the desired level of plasticity to the size such that the sized fiber of the instant system has an extended shelf-life and also the processability to allow successful needling of a mat formed of the sized fibers of the instant invention. The non-crosslinkable polymer generally is a homopolymer or mixtures of homopolymers that will not crosslink in the conditions of the sizing and molding operations to which the sized fiber is subjected in the drying of the aqueous sizing from the fiber and molding with an olefin homopolymer such as polypropylene. Typical of non-crosslinkable film-forming polymers suitable for the instant invention are epoxies, polyesters, polyurethanes and acrylics. A preferred non-crosslinkable film-forming material is vinyl acetate homopolymer as vinyl acetate homopolymer is low in cost, does not degrade at the instant forming temperatures, and provide good strand integrity when used on a glass fiber strand.

The self-reactive crosslinked polymer of the instant system may be any polymer or copolymer that contributes to the formability, strand integrity (hardness), strand lay, non-scroopy finish, and needleability and is capable of auto-co-reaction and cross-linking. These self-reactable crosslinking polymers may be defined as a polymer or copolymer capable of becoming crosslinked without addition of further materials in the conditions encountered during the drying of the sized strand forming package. Typical of self-reactive crosslinking polymers are vinylacetates epoxies, polyesters, polyurethanes and acrylic polymers. A preferred polymer is a self-reactive vinyl acetate-n-methylolacrylamide copolymer that has the advantages of compatibility with the polyolefin polymers particularly polypropylene, low cost, and stability at the forming temperatures of polyolefins.

The sized glass fibers may be formed and the size applied by the known methods of fiber formation and sizing application. Representative of a method of fiber formation and sizing application is the process illustrated in FIG. 2 of U.S. Pat. No. 3,849,148 which is hereby incorporated by reference. Glass fiber filaments emerge from orifices of an electrically heated bushing. These fibers are attenuated and by means of a strand pulling device these filaments are gathered to form a strand of glass fiber which may comprise numerous individual fibers. The sizing is applied to the fibers by a conventional size applicator such as a kiss applicator or a belt applicator device. Detail of a sizing applicator is shown in U.S. Pat. No. 2,728,972. The filaments after exiting the bushing are cooled by air or preferably water. The filaments are gathered into bundles by a gathering shoe and are then led to a strand pulling device such as illustrated in U.S. Pat. No. 3,292,013 as well as in the above referenced, U.S. Pat. No. 3,849,148. The glass fiber strand or strands, if the filaments exiting from the bushing have been separated into several strands, are then wound onto a forming tube on a collet rotating at approximately 7,500 rpm to produce a strand travel of approximately 12,000 to 15,000 feet per minute. The glass fiber strand forming packages are then dried. This generally is accomplished by baking the packages of fiber at a temperature and for a length of time sufficient to remove substantially all of the water. Generally a curing time for the instant size is about 11 hours at 270° F. After drying the forming tube may be removed resulting in a forming package of sized glass fiber. These forming packages may be stored virtually indefinitely when sized with the instant sizing. When the forming package is desired for use in forming a polyolefin composite article, a group of the forming packages are arranged so that the strands may be drawn from the packages and laid down to form a mat of fibers such as disclosed in U.S. Pat. No. 3,883,333 or U.S. Pat. No. 3,664,909. The mat is then needled and combined or impregnated with polyolefin resin or laminated with polyolefin sheets to form reinforced polyolefin articles which are heated at a temperature in the range of 400° F. to about 430° F. at a pressure of about 9250 pounds per square inch for about 5 to about 20 minutes to bind the sized glass fibers of the invention to the polyolefin. The laminated polyolefin glass fiber mat articles may then be stamped or molded by a variety of means, including that of U.S. Pat. No. 3,664,909 hereby incorporated by reference, to produce reinforced polyolefin laminates suitable for use as containers or for other low-cost, high strength and low temperature uses.

The coupling agent may be utilized in amounts which results in good interfacial boundary area adhesion between the glass fiber strand and the polyolefin. A silane coupling agent concentration of about 0.2 to about 18 percent by weight of the solids of the sizing concentration has been found to be suitable. A preferred percent of silane has been found to be about 6 percent by weight of the solids in the sizing of the silane to give maximum adhesion with minimum cost.

The lubricant may be utilized in any amount which results in good stability of the sizing system. A suitable amount has been found to be about 30 to about 80 percent by weight of solids in the sizing solution. A preferred amount of the maleonated amorphous polypropylene for good forming and fabrication processability has been found to be about 60 percent by weight of the solid's in the sizing emulsion.

The stabilizer may be used in any amount which results in good interface bonding of the film-forming materials to the glass fiber strand. A suitable amount has been found to be about 1 to about 9 percent stabilizer to the solids of the sizing emulsion. A preferred amount of stabilizer has been found to be about one-half the amount of the silane coupling agent to give good adhesion of the film formers to the coupling agent.

The non-crosslinkable-film forming material and the self-reactive crosslinking material are blended to give the desired handling properties to the sized strand. The non-crosslinkable polymer, preferably vinyl acetate homopolymer imparts plasticity to the fiber and its use is dependent on the hardness or brittleness of the self-reactive crosslinking film former. The self-reactive crosslinking film former acts to provide integrity to the glass fiber strand so that it does not come apart into filaments during processing or cutting operations. A normal range of the non-crosslinkable polymer would be between about 5 and 40 percent by weight of the solids in the sizing emulsion. A suitable amount of self-reactive crosslinking material would be between about 10 and about 50 percent by weight of the solids in the sizing emulsion. A preferred amount of the self-reactive crosslinking material would be about 22 percent of the solids in the sizing emulsion such that the fiber has good integrity. A preferred amount of the non-crosslinkable vinyl acetate homopolymer is about 9 percent by weight of the solids in the sizing emulsion to give optimum handability.

The sizing emulsion generally contains between about 95 percent and about 80 percent water. It is preferred in the use of a kiss roll applicator to have between 83 and 93 parts by weight water in the sizing solution. Thus, solids amount is greatly dependent on the applicator that is used to size the fiber strand.

The sized fiber forming packages of the instant system may be utilized to reinforce any polymeric resin article. However, the instant fibers find greater functionality in the reinforcement of polyolefinic resin polymers including polyethylene and 5-methyl pentene polymers. A preferred polyolefinic polymer for utilization with the instant sized glass fiber strand is polypropylene since this polymer binds very well with the instant sizing, is relatively low cost and gives good strength properties when glass reinforced. The ratio of polyolefinic polymer to glass may be selected in any ratio that gives the desired properties to the finished article. Generally a ratio of about 10 to about 60 percent glass by weight is suitable. A preferred amount is about 35 to about 45 percent by weight glass in a polypropylene molded article to give a good balance of cost, properties and structural strength.

The amount of the sizings used on the glass may be any amount which results in good structural strength of the finished polyolefin fiber composite, good fiber integrity and handleability. A suitable amount of sizing is about 0.02 to about 1 percent by weight sizing solids to total weight of the sized strand of glass. A preferred range is about 0.6 percent to give good fiber integrity and handleability.

The following Example is a preferred embodiments of the instant invention. The parts and percentages are by weight unless otherwise indicated.

EXAMPLE I

| Ingredient Functional Identification | Chemical Indentification | Parts by Weight Of Sizing | Percent of Size Solids |
|---|---|---|---|
| Coupling agent | gamma-aminopropyltriethoxy-silane (Union Carbide A-1100) | .7 | 6 |
| Stabilizer | cis-butenedioic acid | .35 | 3 |

EXAMPLE I-continued

| Ingredient Functional Identification | Chemical Indentification | Parts by Weight Of Sizing | Percent of Size Solids |
|---|---|---|---|
| Lubricant | emulsion of maleonated amorphous polypropylene 22% active 10% surfactant and KOH 68% water surfactant = alkoxylated phenol | 7.3 | 60 |
| Non-crosslinkable film former | vinylacetate homopolymer emulsion 54% solids (National Starch Resyn 25-1031) | 1.1 | 9 |
| Self-reactive film former | emulsion of vinyl acetate-n-methylolacrylamide 52% solids (National Starch Resyn 25-2828) | 2.6 | 22 |
| Water | | 87.95 | — |

The glass fiber strand sizing is prepared by adding most of the necessary deionized water to the mix tank and then slowly adding the lubricant to the mix tank as it is agitated. The coupling agent is then added to the mix tank followed by adding the maleic acid with continued agitation. After the addition of the maleic acid, stirring is carried out for about 20 minutes to dissolve the acid. Then the non-crosslinkable film-forming material is added to the tank followed by the addition of the crosslinkable polymeric emulsion which is diluted with an equal quantity of cold deionized water prior to addition. Additional make-up water necessary is added and the batch is checked to determine that the specifications are within the range of about a pH of about 6 and a solids of about 5 percent solids.

In a preferred embodiment, the aqueous sizing mixture is applied to fiber filaments that are formed from a 400-hole bushing. The filaments are treated by a kiss roll applicator to coat about 0.6 percent solids by weight of the glass onto the filaments. The filaments are gathered into four strands or more then wound onto the collets to form packages of about 20 pounds or more each. The formed packages are cured for about 11 hours at 270° F. Following the curing the forming package can be stored indefinitely at ambient conditions. The forming packages are then utilized to form a mat of continuous fibers which is then needled and laminated with polypropylene polymer in the weight of about 60 parts by weight of polypropylene polymer to 40 parts by weight of the needled mat. The polyolefin resin and mat are combined via a temperature range of about 400° F. at a pressure of about 90 pounds per square inch for about 5 minutes to bond the reinforcing glass fibers to the polyolefin. The heating is carried out between stainless steel belts. The laminate of sized fiber matting and polypropylene is then stamped into test tubs such as described at column 6 through column 7 of U.S. Pat. No. 3,849,148 and tested for structural strength and structural modulus. The flexural strength averages at least about 23,000 pounds per square inch and the flexural modulus about $1 \times 10^6$ pounds per square inch. This example shows that the polypropylene reinforcing sized glass fiber strands of the instant invention provide satisfactory strong reinforced articles even after extended storage period of the forming packages.

While the invention has been described with reference to several embodiments, those skilled in the art will recognize that variations may be made to the described methods and devices without departing from the substance of this invention. For instance, a pigment or dye could be added to the sizing solution without interference with its effect.

As will be apparent to those skilled in the art, the present system may be modified and equivalent elements or processes may be employed in combination therewith without departing from the spirit of the invention. For instance, an application device for the sizing could be utilized which would not require as large an amount of water in the sizing emulsion. Further, the fiber forming packages of the instant invention could be utilized in the reinforcing of polymeric materials other than polyolefins. Also, a combination of the sized fiber forming packages of this invention could be utilized with fibers sized with a different material, with unsized fibers or with chopped strand sized with the sizing of this invention.

Thus, the present disclosure of preferred embodiments is not intended to limit the scope of the applicant's invention.

I claim:

1. An article comprising a laminate of polyolefin and needled, continuous, glass fiber strand mat where the continuous glass fiber strands in the mat have integrity from the needling and the mat is impregnated throughout with the polyolefin polymer wherein said continuous glass fiber strands have present a dried residue of an aqueous non-peroxide-containing size composition applied during the formation of the continuous strands, where the aqueous size, comprises: an amino coupling agent, stabilizer, maleonated or acrylic modified amorphous polypropylene lubricant, non-crosslinkable film-forming polymer, and a self-reactive crosslinking film-forming polymer.

2. The article of claim 1 wherein said polyolefin is selected from the group consisting of polypropylene, polyethylene, 5-methyl pentene and mixtures thereof.

3. The article of claim 1 wherein said coupling agent is selected from the group consisting of silanes and siloxanes.

4. The article of claim 1 wherein said coupling agent is an aminosilane.

5. The article of claim 1 wherein said stabilizer comprises a difunctional acid selected from the group consisting of ethylenically unsaturated carboxylic acid and anhydrides.

6. The article of claim 1 wherein said stabilizer comprises cis-butenedioic acid.

7. The article of claim 1 wherein said sizing comprises between about 2 and 18 weight percent coupling agent, between about 1 and about 9 weight percent stabilizer, between about 30 and 80 weight percent lubricant, between about 5 and about 40 part by weight non-crosslinkable film former and between about 10 and 50 parts by weight self-reactive film former.

8. The article of claim 1 wherein said noncrosslinking film-forming polymer comprises a member selected from the group consisting of epoxy polymers, polyester polymers, acrylic polymers and mixtures thereof.

9. The article of claim 1 wherein said non-crosslinking polymer is a vinyl acetate homopolymer.

10. The article of claim 1 wherein said crosslinking film-forming polymer is selected from the group consisting of epoxy polymers, polyester polymers, acrylic polymers, and copolymers and mixtures thereof.

11. The article of claim 1 wherein said crosslinked polymer is a vinyl acetate copolymer.

12. A method of forming a composite article of polyolefin reinforced with needled, continuous glass fiber strand mat, wherein integrity is provided to the continuous glass fiber strands within the mat by needling and wherein the mat is impregnated through with the polyolefin polymer, comprising:
a. applying to the glass fibers after the formation of the fibers from orifices in a bushing in a glass melting furnace a non-peroxide-containing sizing having a stabilizer, amino coupling agent, maleonated or acrylic modified amorphous polypropylene lubricant, noncrosslinkable polymer and self-reactive crosslinking polymer and aqueous carrier,
b. collecting the sized glass fiber into bundles of fibers,
c. laying down a plurality of the continuous glass fiber strands to form a mat,
d. needling the mat,
e. bring together the needled mat of sized continuous glass fiber strands and polyolefin polymer,
f. applying pressure to form a reinforced polyolefin article,
g. heating the reinforced polyolefin articles under pressure to bind the sized glass fibers in the needled continuous strand mat to the polyolefin,
h. decreasing the temperature and pressure to produce composites of polyolefin and needled continuous glass fiber strand mat suitable for molding or stamping.

13. Method of claim 12 which includes:
a. winding the bundles of fibers into forming packages,
b. drying the forming package to remove a substantial amount of the aqueous carrier,
c. arranging a plurality of dried forming packages for strand removal,
d. drawing the strands from the plurality of dried forming packages,
e. laying down the drawn strands to form a mat to be needled and produced into a polyolefin glass fiber strand reinforced article for molding or stamping.

14. The article of claim 1 wherein said stabilizer comprises himic anhydride.

15. The article of claim 1 wherein said amino coupling agent is selected from the group of Werner type coupling agents having amino groups.

16. The method of claim 12 or claim 13 wherein said amino coupling agent is selected from the group consisting of amino-silanes and amino-siloxanes.

17. The method of claim 12 or claim 13 wherein said stabilizer comprises a mono or difunctional acid selected from the group consisting of ethylenically unsaturated carboxylic acid and anhydrides.

18. The method of claim 12 or claim 13 wherein said stabilizer comprises cis-butenedioic acid.

19. The method of claim 12 or claim 13 wherein said sizing comprises between about 2 and 18 weight percent coupling agent, between about 1 and 9 weight percent stabilizer, between about 30 and 80 weight percent lubricant, between about 5 and about 40 parts by weight non-crosslinkable film former and between about 10 and 50 parts by weight self-reactive film former.

20. The method of claim 12 or claim 13 wherein said non-crosslinked film-forming polymer comprises a member selected from the group consisting of epoxy polymers, polyester polymers, acrylic polymers and mixtures thereof.

21. The method of claim 12 or claim 13 wherein said non-crosslinking polymer is a vinyl acetate homopolymer.

22. The method of claim 12 or claim 13 wherein said crosslinked film-forming polymer is selected from the group consisting of epoxy polymers, polyester polymers, acrylic polymers, and copolymers and mixtures thereof.

23. The method of claim 12 or claim 13 wherein said crosslinked polymer is a vinyl acetate copolymer.

24. The process of claim 12 or claim 13 wherein said sizing comprises about 0.6 percent by weight of said sized fiber.

25. The process of claim 12 or claim 13 wherein said sizing comprises about 6 percent by weight of said silane, about 3 percent by weight of said cis-butenedioic acid, about 60 percent by weight of said maleonated amorphous polypropylene, about 9 percent by weight of said vinylacetate homopolymer and about 22 parts by weight of said vinylacetate-n-methyolacrylamide copolymer.

26. The method of claim 12 or claim 13 wherein said amino coupling agent is selected from the group of Werner type coupling agents having amino groups.

27. The method of claim 12 or claim 13 wherein said polyolefin polymer is selected from the group consisting of polyethylene, polypropylene, 5-methyl pentene, and mixtures thereof.

28. The method of claim 12 or claim 13 wherein said glass strands comprise about 10 to about 60 percent by weight of said article.

* * * * *